US011512845B2

United States Patent
Cao et al.

(10) Patent No.: US 11,512,845 B2
(45) Date of Patent: Nov. 29, 2022

(54) LIGHTING APPARATUS WITH HEAT DISSIPATION UNIT

(71) Applicant: LEEDARSON LIGHTING CO., LTD., Fujian (CN)

(72) Inventors: Liangliang Cao, Fujian (CN); Yuxin Huang, Fujian (CN)

(73) Assignee: LEEDARSON LIGHTING CO., LTD., Fujian (CN)

( * ) Notice: Subject to any disclaimer, the term of this patent is extended or adjusted under 35 U.S.C. 154(b) by 0 days.

(21) Appl. No.: 17/566,978

(22) Filed: Dec. 31, 2021

(65) Prior Publication Data

US 2022/0205595 A1    Jun. 30, 2022

(30) Foreign Application Priority Data

Dec. 31, 2020   (CN) .......................... 202023343154.0
Dec. 31, 2020   (CN) .......................... 202023344470.X
Dec. 31, 2020   (CN) .......................... 202023344483.7

(51) Int. Cl.
| | |
|---|---|
| *F21K 9/232* | (2016.01) |
| *F21K 9/237* | (2016.01) |
| *F21V 23/00* | (2015.01) |
| *F21V 23/04* | (2006.01) |
| *F21V 29/70* | (2015.01) |
| *F21V 29/60* | (2015.01) |
| *F21V 29/89* | (2015.01) |
| *F21Y 115/10* | (2016.01) |

(52) U.S. Cl.
CPC .............. *F21V 29/70* (2015.01); *F21K 9/232* (2016.08); *F21K 9/237* (2016.08); *F21V 23/007* (2013.01); *F21V 23/0471* (2013.01); *F21V 29/60* (2015.01); *F21V 29/89* (2015.01); *F21Y 2115/10* (2016.08)

(58) Field of Classification Search
CPC .... F21V 23/007; F21V 23/0471; F21K 9/237; F21K 9/232; F21K 9/235
See application file for complete search history.

(56) References Cited

U.S. PATENT DOCUMENTS

2020/0340645 A1*   10/2020   Chen ....................... F21V 17/12

* cited by examiner

*Primary Examiner* — Karabi Guharay
(74) *Attorney, Agent, or Firm* — Chun-Ming Shih; Lanway IPR Services (57) ABSTRACT

A lighting apparatus includes a light head, a driver box, multiple separating columns and a light source module. The light head has an Edison cap and a head body. The head body has a rotatable connector. The driver box has a first side and a second side for containing a driver circuit. The first side of the driver box has a fixing unit corresponding to the rotatable connector of the head body to selectively attach or detach the light head from the driver box by rotating the rotatable connector with respect to the fixing unit. The light source plate has a light source plate mounted with LED modules. The light source plate is fixed to the driver box with the multiple separating columns. The separating columns form an air gap between the driver box and the light source for heat dissipation.

20 Claims, 11 Drawing Sheets

LIGHTING APPARATUS WITH HEAT DISSIPATION UNIT

FIELD

The present invention is related to a lighting apparatus, and more particularly related to a lighting apparatus with nice heat dissipation function.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

In some factories or commercial applications, light devices generate lots of heat. It is important to provide a design with nice heat dissipation effect to ensure life span of the light device.

When cost is also considered in the design, it provides more benefit to the overall products.

SUMMARY

In some embodiments, a lighting apparatus includes a light head, a driver box, multiple separating columns and a light source module.

The light head has an Edison cap and a head body.

The head body has a rotatable connector.

The driver box has a first side and a second side for containing a driver circuit. The first side of the driver box has a fixing unit corresponding to the rotatable connector of the head body to selectively attach or detach the light head from the driver box by rotating the rotatable connector with respect to the fixing unit.

The light source module is fixed to the driver box for receiving a driving current generated by the driver circuit.

The light source plate has a light source plate mounted with LED modules.

The light source plate is fixed to the driver box with the multiple separating columns, the separating columns form an air gap between the driver box and the light source for heat dissipation.

In some embodiments, the lighting apparatus may also include an support bracket with a bracket connector with the same structure as the rotatable connector for fixing to the fixing unit of the driver box to selectively replace the light head.

In some embodiments, a lens cover is attached to the light source plate.

In some embodiments, the lens cover has multiple lens units respectively covering the LED modules for diffusing lights of the LED modules.

In some embodiments, the lighting apparatus may also include a wire tube for passing a wire from the driver circuit to electrically connect to the LED modules for supplying the driving current.

In some embodiments, the lighting apparatus may also include a fan emitting an flow into the air gap to carry away heat of the light source plate.

In some embodiments, the lighting apparatus may also include a motion sensor disposed at a center of the light source plate.

The motion sensor has a signal wire extended from the driver box.

In some embodiments, the light source plate has a wire passing area with a thinner thickness than adjacent area to be broken to insert the motion sensor.

In some embodiments, the lighting apparatus may also include an antenna disposed at a center of the light source plate.

The antenna is connected to a signal wire extended from the driver box.

In some embodiments, the driver box has a rotation switch for manually operated to adjust a first parameter in a continuous manner for setting the driver circuit.

In some embodiments, the rotation switch is used for adjusting the first parameter of a light intensity of the LED modules.

In some embodiments, the lighting apparatus may also include a separate manual switch for adjusting a second parameter for setting the driver circuit.

In some embodiments, the second parameter is corresponding to one of multiple optical features, and the first parameter is corresponding an adjusted value of the selected second optical feature using the separate manual switch.

In some embodiments, the light source plate is a metal plate including a metal layer for heat dissipation.

In some embodiments, the lighting apparatus may also include a function module to be selectively attached to the driver box to add an extended function to the driver box.

In some embodiments, the function module has an additional fixing unit with the same structure as the fixing unit to attach to the light head.

In some embodiments, multiple screws are used for fixing a light strip mounted with the LED modules to the light source plate.

The light source plate has multiple screw grooves for fixing the multiple screws.

The multiple screws stay in the screw grooves without passing through the light source plate.

In some embodiments, the screws are metal material for passing heat of the light strip to the light source plate.

In some embodiments, the light source plate has a turned edge.

In some embodiments, the lighting apparatus may also include a temperature sensor collecting an operation temperature of the light source module.

The driver circuit divides the LED modules into multiple areas and turn on and turn off these areas periodically and turn off at least one area in sequence when the operation temperature is larger than a temperature threshold.

DETAILED DESCRIPTION

Figure 7:
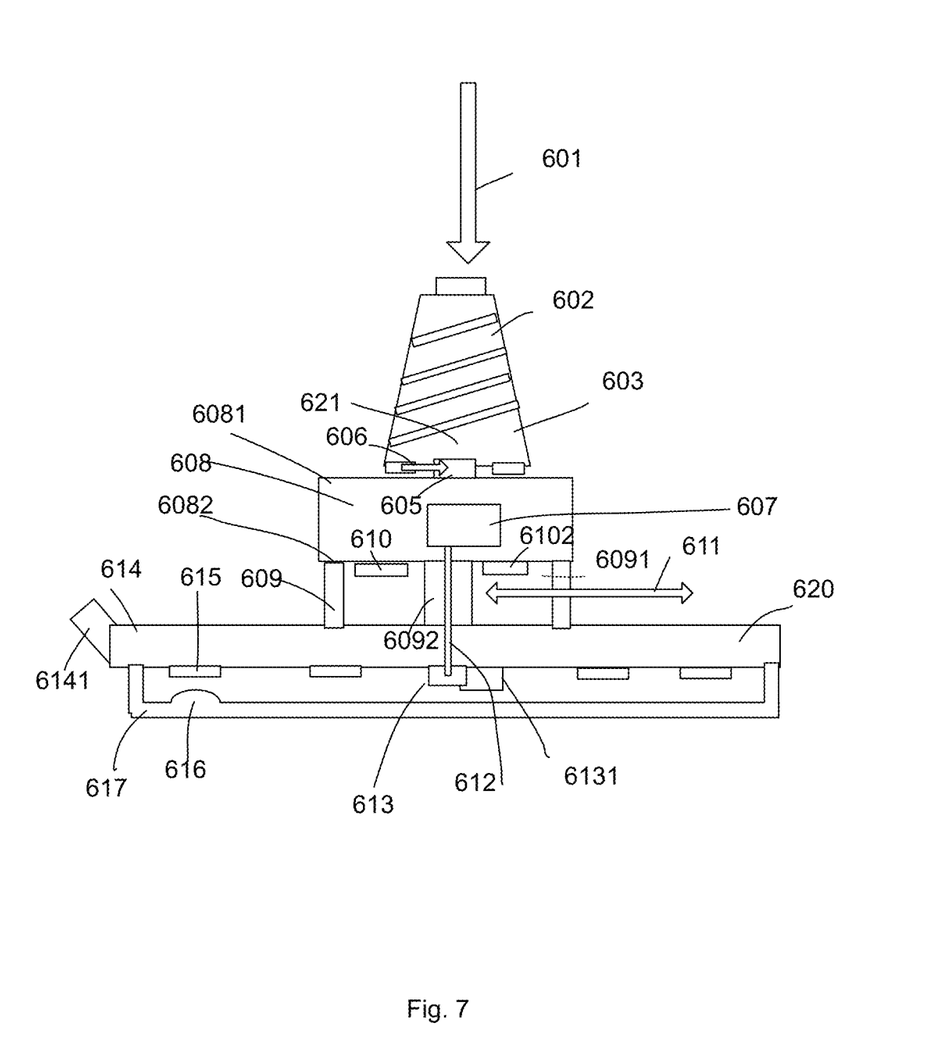
FIG. 7 shows another lighting apparatus embodiment.

In FIG. 7, a lighting apparatus includes a light head 603, a driver box 608, multiple separating columns 609 and a light source module 615.

The light head 603 has an Edison cap 602 and a head body 621.

The head body 621 has a rotatable connector 606.

The driver box 608 has a first side 6081 and a second side 6082 for containing a driver circuit 607. The first side 6081 of the driver box 608 has a fixing unit 605 corresponding to the rotatable connector 606 of the head body 621 to selectively attach or detach the light head 603 from the driver box 608 by rotating the rotatable connector 606 with respect to the fixing unit 605.

There are multiple separating columns 609.

The light source module 614 is fixed to the driver box 608 for receiving a driving current generated by the driver circuit 607.

The light source module 614 has a light source plate 620 mounted with LED modules 615.

The light source plate 620 is fixed to the driver box 608 with the multiple separating columns 609. The separating columns 609 form an air gap 6091 between the driver box 608 and the light source plate 620 for heat dissipation.

For example, air 611 between the driver box 608 and the light source plate 620 may flow particularly when the light source plate 620 is heated.

In some embodiments, the lighting apparatus may also include an support bracket with a bracket connector with the same structure as the rotatable connector for fixing to the fixing unit 605 of the driver box 608 to selectively replace the light head.

Figure 8:
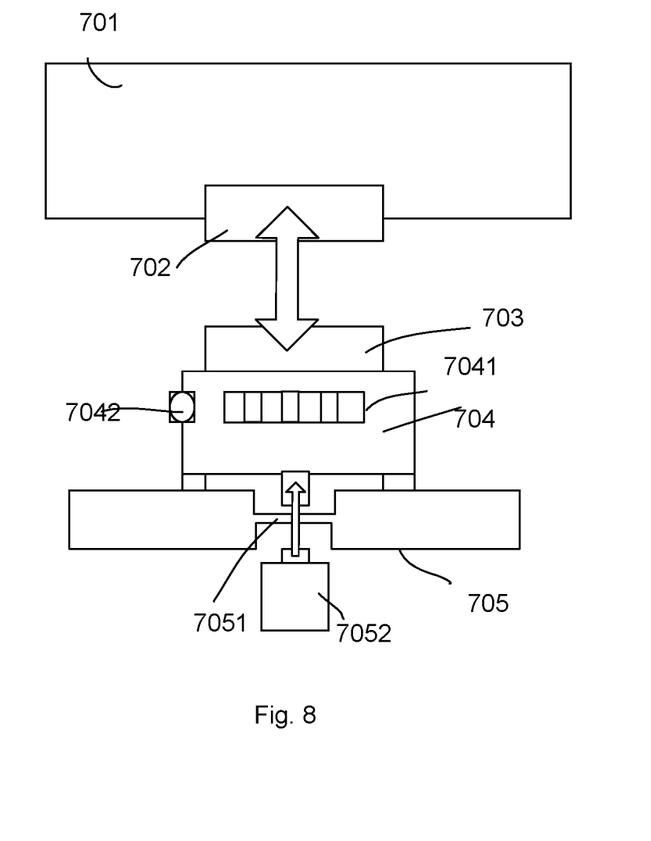
FIG. 8 shows another lighting apparatus example.

In FIG. 8, the driver box 704 has a fixing unit 703 with a groove, a block, a concave or other plugging structure for connecting to a corresponding bracket connector 702. The bracket 701 is disposed with the bracket connector 702 so that when the bracket connector 702 is fixed to the fixing unit 703, the driver box 704 is attached to the bracket 701.

The fixing unit 703 may be the same for connecting the rotatable connector of the light head mentioned above, or may be another separate connector.

With such design, the driver box may be attached to different installation platforms, just to replace a different bracket or a different platform with a corresponding connecting structure as mentioned above.

In addition, the light head may be detached to decrease the overall size when the lighting apparatus is installed to another platform.

In FIG. 7, a lens cover 617 is attached to the light source plate 620.

In some embodiments, the lens cover 617 has multiple lens units 616 respectively covering the LED modules 615 for diffusing lights of the LED modules 615.

For example, there may be fifty LED modules disposed on the light source plate 620. In such case, there are fifty lens units placed under corresponding fifty LED modules. With such design, the light source is easily to be scalable, depending on the desired light intensity.

Figure 9:
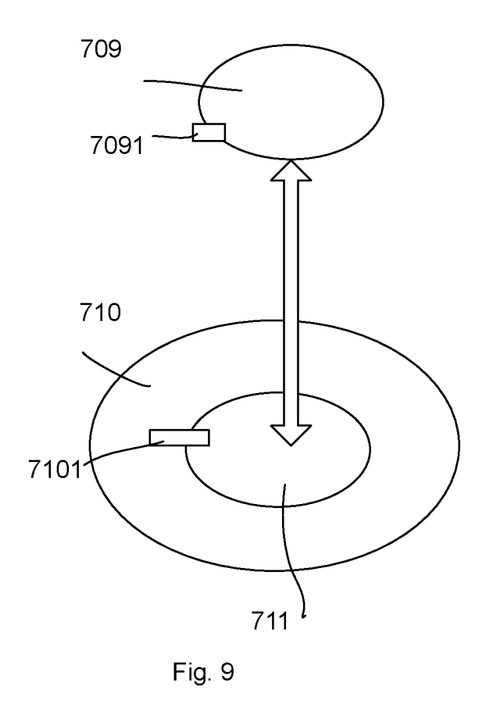
FIG. 9 shows a lens cover example.

In addition, the lens cover may be made for several diameters. Lens cover with a smaller diameter may be assembled to a larger diameter.

FIG. 9 shows an example of such design. A lens cover 709 with a smaller diameter may be assembled to an opening 711 of a larger lens cover 710. The connector 7091 of the lens cover 709 is attached to the connector 7101 of the larger lens cover 710.

Furthermore, the lens cover 709 may contain different lens structures as the larger lens cover 710. For example, the lens cover 709 may contain lens units for condensing light while the larger lens cover may contain lens units for diffusing light.

In such design, the larger lens cover 710 may provide an overall illumination while the lens cover 709 provides a light beam.

In FIG. 7, the lighting apparatus may also include a wire tube 6092 for passing a wire 612 from the driver circuit 607 to electrically connect to the LED modules 615 for supplying the driving current.

In some embodiments, the lighting apparatus may also include a fan 610 emitting an flow into the air gap to carry away heat of the light source plate.

In some embodiments, the lighting apparatus may also include a motion sensor 613 disposed at a center of the light source plate 620.

The motion sensor 613 has a signal wire, e.g. using the wire 612, extended from the driver box 608.

An antenna 6131 may be integrated with the motion sensor 613 to be placed on surface of the light source plate 620. The antenna 6131 may be connected to the driver circuit 607 so as to transmit or to receive a wireless signal to or from an external device.

In some embodiments, the light source plate has a wire passing area with a thinner thickness than adjacent area to be broken to insert the motion sensor.

In FIG. 8, the light source plate 705 has a thinner thickness area 7051 so that the sensor module 7052 containing the motion sensor may be attached by breaking the thinner thickness area 7051 to contact the circuit of the driver box 704.

In some embodiments, the lighting apparatus may also include an antenna disposed at a center of the light source plate.

The antenna is connected to a signal wire extended from the driver box.

In FIG. 8, the driver box has a rotation switch 7042 for manually operated to adjust a first parameter in a continuous manner for setting the driver circuit.

In FIG. 8, there is another discrete switch set 7041. A discrete setting may be set by a user. For example, three color temperatures may be selected via the discrete switch set 7041. Users may select one from the three color temperatures.

In such case, the rotation switch 7042 is reserved for setting another parameter.

In some embodiments, the rotation switch is used for adjusting the first parameter of a light intensity of the LED modules. For example, a maximum light intensity may be set by a user before installing the lighting apparatus to a ceiling of a factory or a living room.

In some embodiments, the lighting apparatus may also include a separate manual switch, e.g. the discrete switch set 7041, for adjusting a second parameter for setting the driver circuit.

In some embodiments, the second parameter is corresponding to one of multiple optical features, and the first parameter is corresponding an adjusted value of the selected second optical feature using the separate manual switch.

Figure 10:
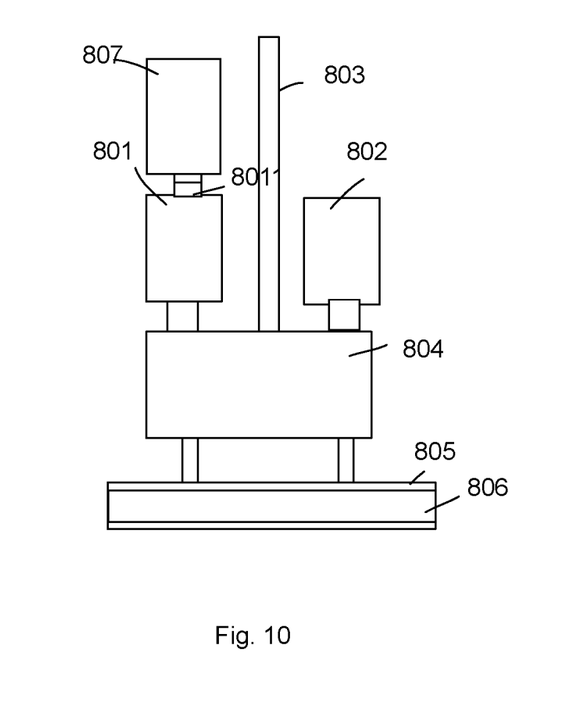
FIG. 10 shows an expandable module design example.

In FIG. 10, the light source plate is a metal plate 805 including a metal layer 806 for heat dissipation.

In some embodiments, the lighting apparatus may also include a function module 801 to be selectively attached to the driver box 804 to add an extended function to the driver box 804.

For example, there may be multiple plugging slots for inserting a function module 801. Different function modules 801, 802 may be inserted depending on different needs. For example, to expand the function of the driver box 804, like a speaker or a IoT (Internet of Things) gateway, may be selectively added to the driver box 804.

In some embodiments, the function module 801 has an additional fixing unit 8011 with the same structure as the fixing unit to attach to the light head 807. In other words, the function module 801 may be integrated with the driver box 804 in a manner of series connection, and then attached to the light head just as the manner for the driver box without the function module to connect to the light head.

Figure 11:
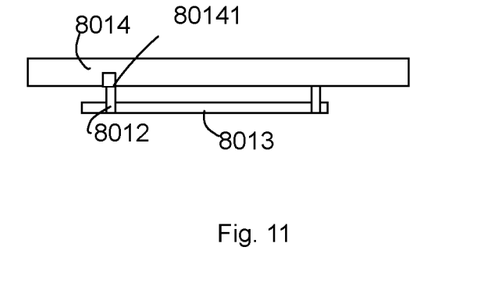
FIG. 11 shows a screw and a screw groove practice.

In FIG. 11, multiple screws 8012 are used for fixing a light strip 8013 mounted with the LED modules to the light source plate 8014.

The light source plate 8014 has multiple screw grooves 80141 for fixing the multiple screws 8012.

The multiple screws 8012 stay in the screw grooves 80141 without passing through the light source plate 8014.

In some embodiments, the screws are metal material for passing heat of the light strip to the light source plate.

In FIG. 7, the light source plate 614 has a turned edge 614 for enhancing a structure strength.

In some embodiments, the lighting apparatus may also include a temperature sensor 6102 collecting an operation temperature of the light source module.

The driver circuit divides the LED modules into multiple areas and turn on and turn off these areas periodically and turn off at least one area in sequence when the operation temperature is larger than a temperature threshold. For example, the LED modules 616 disposed over the light source plate 614 are divided into three areas so as to alternatively turn on to increase a lifespan of the overall LED modules.

Please refer to FIG. 1 to FIG. 6, which shows another embodiment. Among FIG. 1 to FIG. 6, the same reference numerals refer to same components and may not be repeated again if being described.

Figure 1:
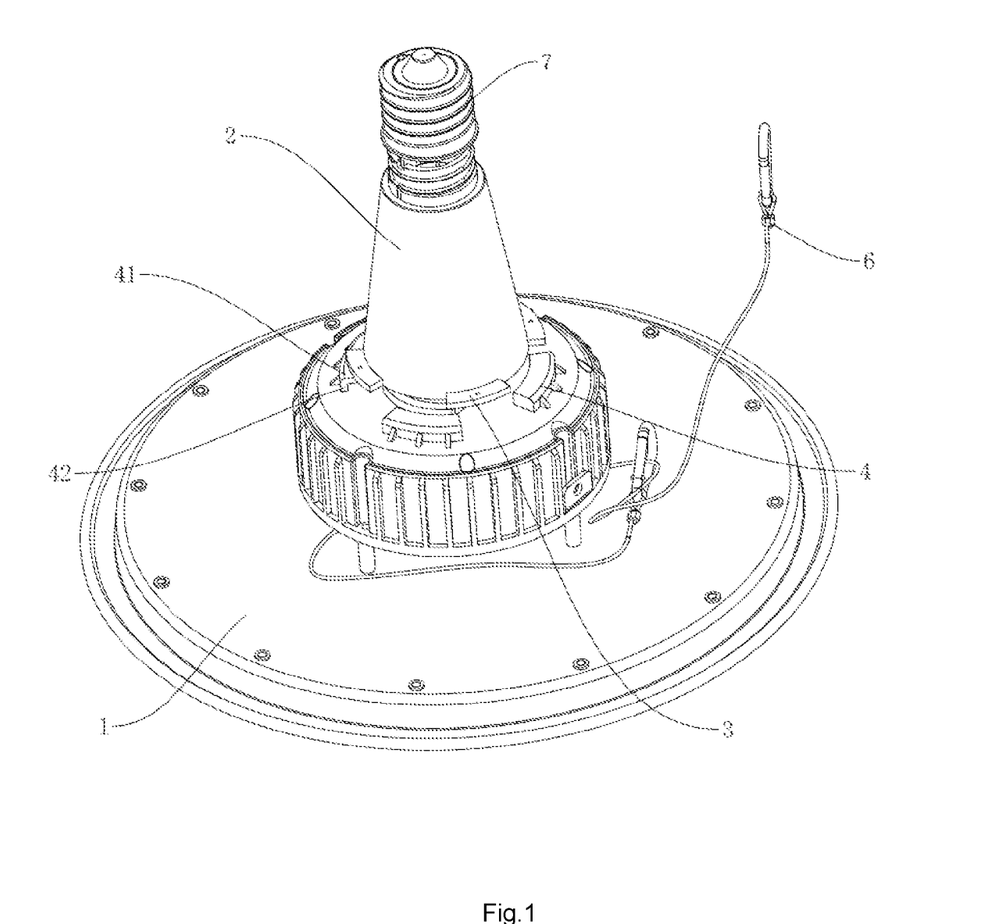
FIG. 1 illustrates a lighting apparatus embodiment.

In FIG. 1, the lighting apparatus includes an Edison cap 7 attached to a light head 2. The light head 2 has a rotation connector 3 to be attached to a fixing unit 4 on driver box 40.

The fixing unit 4 has a top part 41 and a wall 42 for building a slide track for inserting the rotation connector 3.

The driver box 40 is attached to a light source plate 1 with several columns 401.

Figure 2:
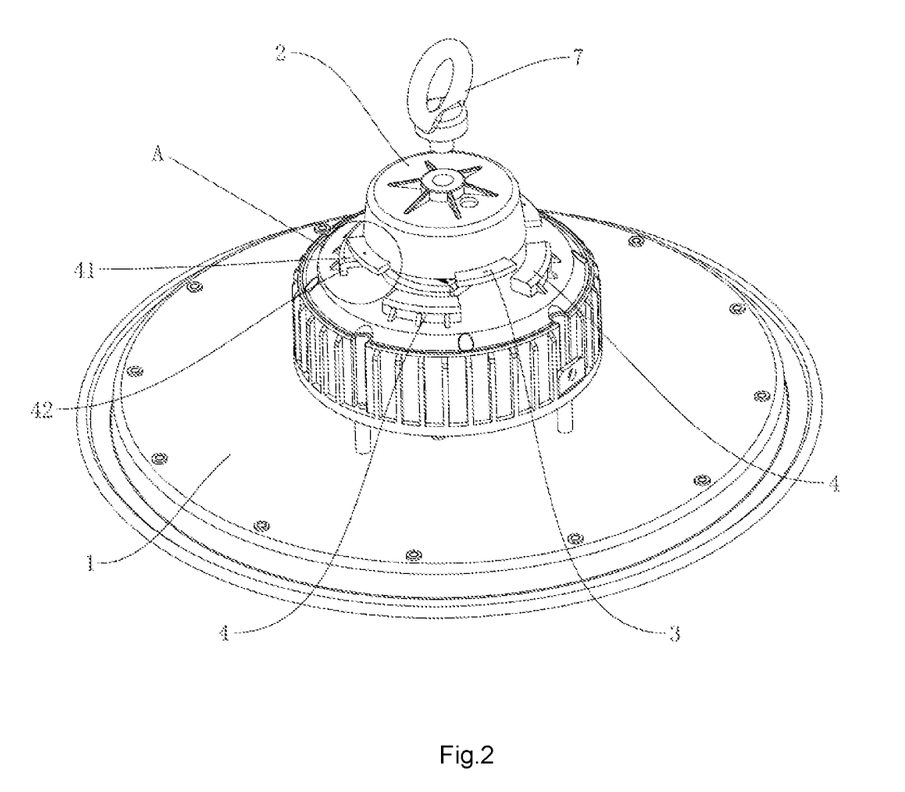
FIG. 2 illustrates the lighting apparatus embodiment with a replacement for another support bracket.

FIG. 2 shows when the light head is replaced with another bracket 22 that also has a rotation connector 3 to fix to the fixing unit 4 of the driver box.

Figure 3:
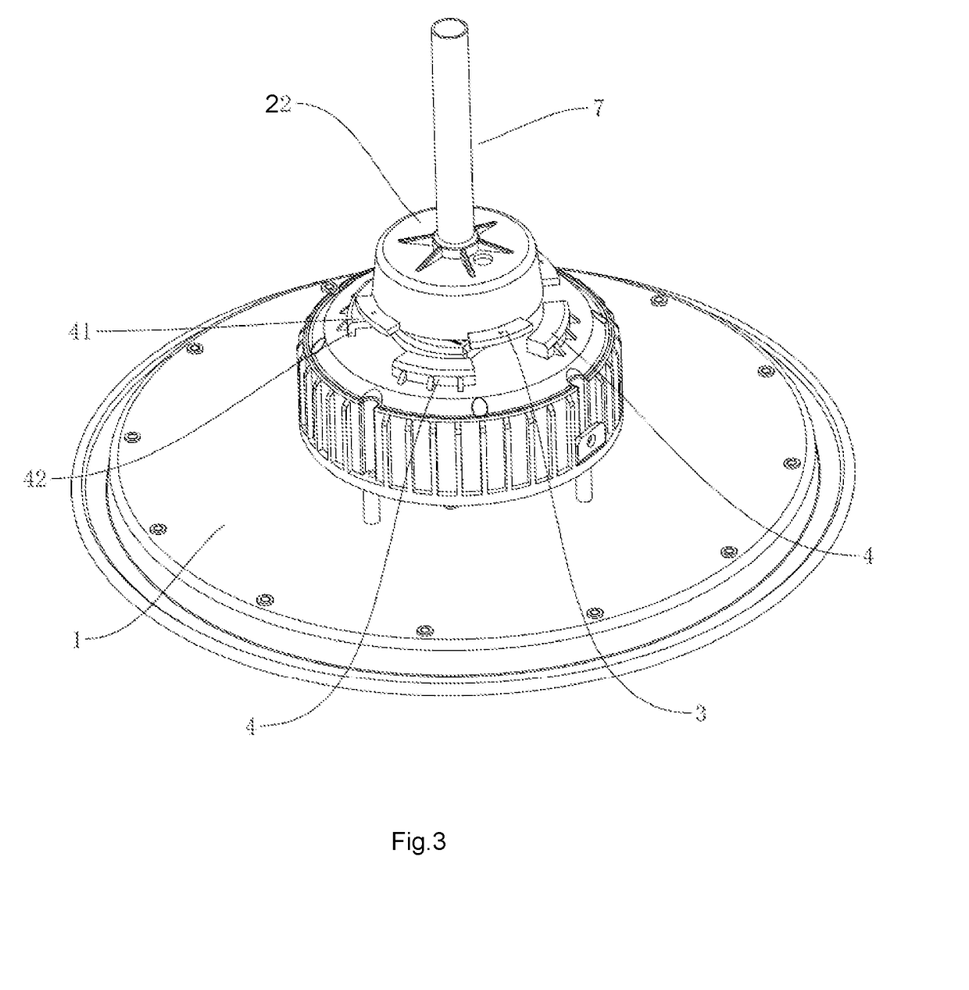
FIG. 3 illustrates the lighting apparatus embodiment with another replacement support bracket.

FIG. 3 shows a connector lever 7 fixed to the bracket 22.

Figure 4:
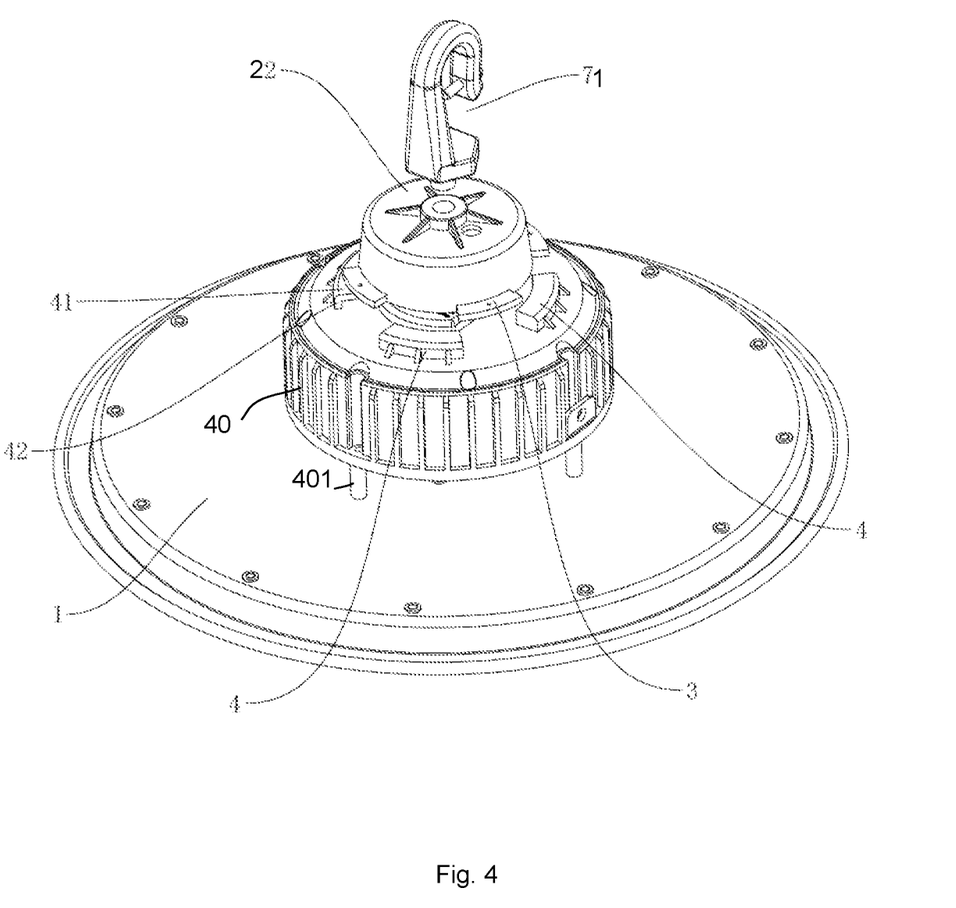
FIG. 4 illustrates the lighting apparatus with another replacement support bracket.

FIG. 4 shows another type of a connector 71 to fixed to the bracket 22.

Figure 5:
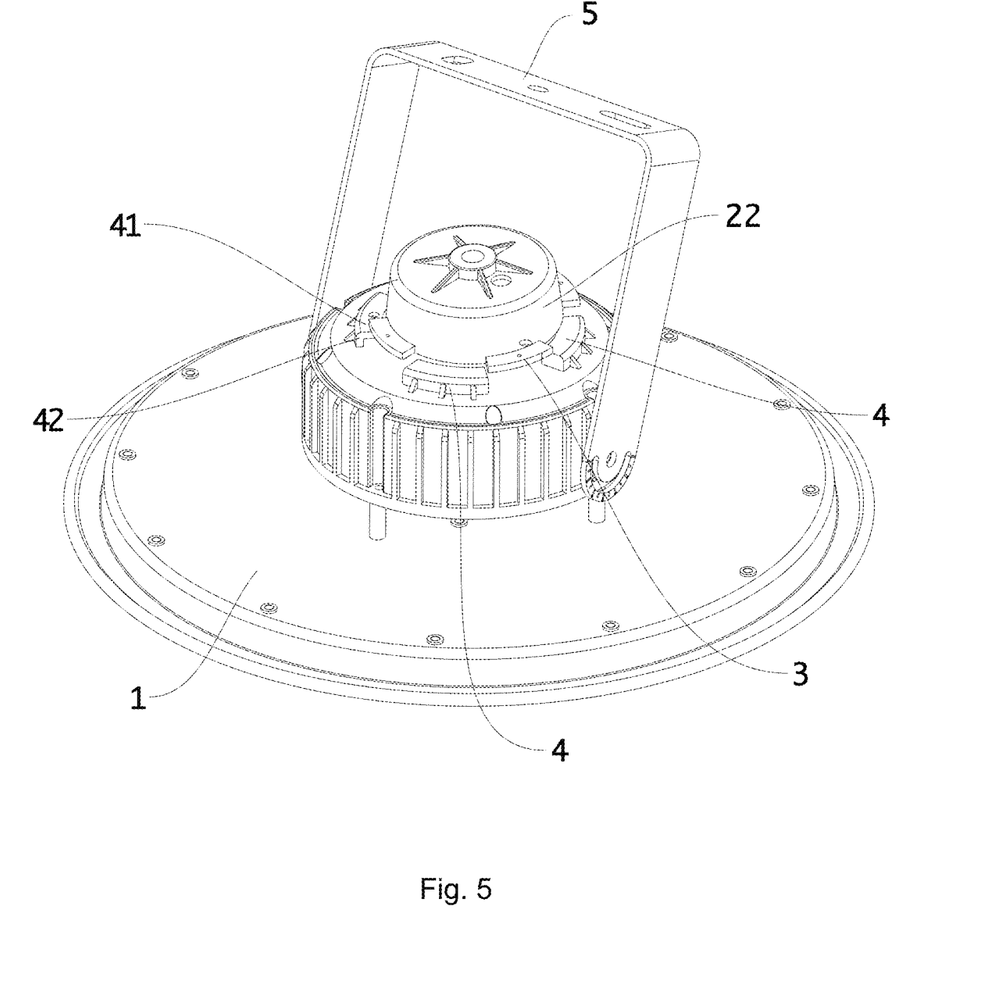
FIG. 5 illustrates the lighting apparatus with another replacement support bracket.

FIG. 5 shows a U-shape handle 5 attached to the lateral wall of the driver box.

Figure 6:
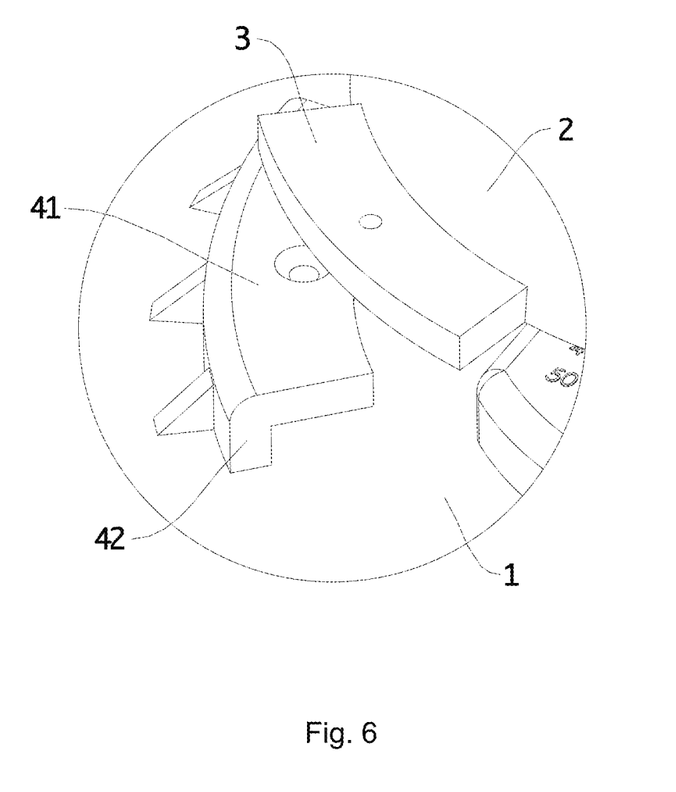
FIG. 6 illustrates a zoom-up view of the connection between a fixing unit and a rotatable connector.

FIG. 6 shows a zoom-up view of a connection structure among components mentioned above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:
a light head with an Edison cap and a head body, wherein the head body has a rotatable connector;
a driver box with a first side and a second side for containing a driver circuit, where the first side of the driver box has a fixing unit corresponding to the rotatable connector of the head body to selectively attach or detach the light head from the driver box by rotating the rotatable connector with respect to the fixing unit;
multiple separating columns;
a light source module fixed to the driver box for receiving a driving current generated by the driver circuit, wherein the light source module has a light source plate mounted with LED modules, the light source plate is fixed to the driver box with the multiple separating columns, the separating columns form an air gap between the driver box and the light source for heat dissipation.

2. The lighting apparatus of claim 1, further comprising an support bracket with a bracket connector with the same structure as the rotatable connector for fixing to the fixing unit of the driver box to selectively replace the light head.

3. The lighting apparatus of claim 1, wherein a lens cover is attached to the light source plate.

4. The lighting apparatus of claim 1, wherein the lens cover has multiple lens units respectively covering the LED modules for diffusing lights of the LED modules.

5. The lighting apparatus of claim 1, further comprising a wire tube for passing a wire from the driver circuit to electrically connect to the LED modules for supplying the driving current.

6. The lighting apparatus of claim 1, further comprising a fan emitting a flow into the air gap to carry away heat of the light source plate.

7. The lighting apparatus of claim 1, further comprising a motion sensor disposed at a center of the light source plate, wherein the motion sensor has a signal wire extended from the driver box.

8. The lighting apparatus of claim 7, wherein the light source plate has a wire passing area with a thinner thickness than adjacent area to be broken to insert the motion sensor.

9. The lighting apparatus of claim 1, further comprising an antenna disposed at a center of the light source plate, wherein the antenna is connected to a signal wire extended from the driver box.

10. The lighting apparatus of claim 1, wherein the driver box has a rotation switch for manually operated to adjust a first parameter in a continuous manner for setting the driver circuit.

11. The lighting apparatus of claim 10, wherein the rotation switch is used for adjusting the first parameter of a light intensity of the LED modules.

12. The lighting apparatus of claim 10, further comprising a separate manual switch for adjusting a second parameter for setting the driver circuit.

13. The lighting apparatus of claim 12, wherein the second parameter is corresponding to one of multiple optical features, and the first parameter is corresponding an adjusted value of the selected second optical feature using the separate manual switch.

14. The lighting apparatus of claim 1, wherein the light source plate is a metal plate comprising a metal layer for heat dissipation.

15. The lighting apparatus of claim 1, further comprising a function module to be selectively attached to the driver box to add an extended function to the driver box.

16. The lighting apparatus of claim 15, wherein the function module has an additional fixing unit with the same structure as the fixing unit to attach to the light head.

17. The lighting apparatus of claim 1, wherein multiple screws are used for fixing a light strip mounted with the LED modules to the light source plate, the light source plate has multiple screw grooves for fixing the multiple screws, the multiple screws stay in the screw grooves without passing through the light source plate.

18. The lighting apparatus of claim 17, wherein the screws are metal material for passing heat of the light strip to the light source plate.

19. The lighting apparatus of claim 1, wherein the light source plate has a turned edge.

20. The lighting apparatus of claim 1, further comprising a temperature sensor collecting an operation temperature of the light source module, wherein the driver circuit divides the LED modules into multiple areas and turn on and turn off these areas periodically and turn off at least one area in sequence when the operation temperature is larger than a temperature threshold.

* * * * *